United States Patent
Marconi et al.

(10) Patent No.: US 9,996,843 B2
(45) Date of Patent: Jun. 12, 2018

(54) NANO-STAMP AND MATCHED READER FOR ANTI-COUNTERFEITING APPLICATIONS

(71) Applicants: COLORADO STATE UNIVERSITY RESEARCH FOUNDATION, Fort Collins, CO (US); XUV LASERS, INC., Fort Collins, CO (US)

(72) Inventors: Mario C. Marconi, Fort Collins, CO (US); Carmen S. Menoni, Fort Collins, CO (US); Jorge J. Rocca, Fort Collins, CO (US)

(73) Assignees: Colorado State University Research Foundation, Fort Collins, CO (US); XUV Lasers, Inc., Fort Collins, CO (US)

( * ) Notice: Subject to any disclaimer, the term of this patent is extended or adjusted under 35 U.S.C. 154(b) by 0 days. days.

(21) Appl. No.: 14/571,259

(22) Filed: Dec. 15, 2014

(65) Prior Publication Data

US 2015/0213461 A1 Jul. 30, 2015

Related U.S. Application Data

(60) Provisional application No. 61/915,761, filed on Dec. 13, 2013.

(51) Int. Cl.
*G06Q 30/00* (2012.01)
*B42D 25/00* (2014.01)
(Continued)

(52) U.S. Cl.
CPC ......... *G06Q 30/0185* (2013.01); *B42D 25/29* (2014.10); *B42D 25/328* (2014.10); *G07D 7/003* (2017.05)

(58) Field of Classification Search
None
See application file for complete search history.

(56) References Cited

U.S. PATENT DOCUMENTS

2004/0197771 A1* 10/2004 Powers ................... C12Q 1/04
435/5
2008/0259455 A1 10/2008 Stuck et al.
(Continued)

OTHER PUBLICATIONS

Li, Wei, et al. "Defect-free periodic structures using extreme ultraviolet Talbot lithography in a table-top system." Journal of Vacuum Science & Technology B 31.6 (2013): 06F604-1.*
(Continued)

*Primary Examiner* — Shawn Decenzo
(74) *Attorney, Agent, or Firm* — Samuel M. Freund; Cochran Freund & Young LLC

(57) ABSTRACT

A method and system for reading a security seal having a unique far-field pattern are described. Periodic nano-structure is generated on the surface of a substrate having spacings of hundreds of nanometers, or smaller, and affixed on a product, or generated directly onto the product. A laser beam having a wavelength longer than the periodic spacings directed onto at least a portion of the surface of the substrate at a chosen angle of incidence and a selected azimuthal angle relative to a chosen direction produces a unique far-field pattern that may be imaged by a digital image detector disposed at a chosen distance from the illuminated region, compared with a stored reference, and validated. The nanoscale sub-wavelength patterns can be printed using extreme ultraviolet light and read with readily available visible or ultraviolet light. The security seal contains a pattern that is invisible to the eye and to an optical microscope. Brand protection at different stages of the life-span of a product, from production to purchase is therefore available.

24 Claims, 6 Drawing Sheets

(51) Int. Cl.
  *G07D 7/00* (2016.01)
  *B42D 25/29* (2014.01)
  *B42D 25/328* (2014.01)

(56) References Cited

U.S. PATENT DOCUMENTS

| | | | |
|---|---|---|---|
| 2009/0250520 A1* | 10/2009 | Nanjo | G06K 19/06037 235/457 |
| 2010/0073688 A1 | 3/2010 | Abdulhalim et al. | |
| 2010/0091284 A1 | 4/2010 | Mieher et al. | |
| 2010/0253760 A1 | 10/2010 | Audouard et al. | |
| 2012/0269403 A1* | 10/2012 | Blair | G06K 9/2018 382/112 |
| 2013/0208327 A1* | 8/2013 | Bolle | B41M 3/144 359/2 |
| 2013/0229652 A1* | 9/2013 | Amako | G01N 21/553 356/301 |
| 2013/0256726 A1* | 10/2013 | Jin | G02B 19/0061 257/98 |
| 2014/0239627 A1* | 8/2014 | De Bougrenet | G02B 5/001 283/67 |
| 2014/0293423 A1* | 10/2014 | Power | G03H 1/0011 359/558 |
| 2015/0099348 A1* | 4/2015 | Lee | H01L 21/02642 438/478 |
| 2015/0224809 A1* | 8/2015 | Tompkin | B42D 25/328 283/73 |

OTHER PUBLICATIONS

Klaessig, Fred, Martha Marrapese, and Shuji Abe. "Current perspectives in nanotechnology terminology and nomenclature." Nanotechnology Standards. Springer New York, 2011. 21-52.*
International Searching Authority, International Search Report, PCT/US14/70423, dated Jun. 25, 2015, pp. 1-12.

* cited by examiner

NANO-STAMP AND MATCHED READER FOR ANTI-COUNTERFEITING APPLICATIONS

CROSS-REFERENCE TO RELATED APPLICATIONS

The present application claims the benefit of U.S. Provisional Patent Application No. 61/915,761 for "Method For Creating A Nano-Stamp And A Matched Reader For Anti-Counterfeiting Applications," by Mario C. Marconi et al., which was filed on Dec. 13, 2013, the contents of which application is hereby specifically incorporated by reference herein for all that it discloses and teaches.

FIELD OF THE INVENTION

The present invention relates generally to validation of security identification seals and, more particularly, to an apparatus and method including a nano-structured surface, which upon interrogation using near infrared, visible or ultraviolet light generates a unique, far-field reflection pattern, which is validated using a reader adapted for this purpose that reveals the existence of the seal without revealing its geometry, creating thereby a high level of security.

BACKGROUND OF THE INVENTION

The annual global trade in illegitimate goods is about $US 600B. By 2015, the total impact of the trade in counterfeits and pirated goods—including the value of domestically sold fakes, those traded on the internet, and the added costs to society through lost taxes and jobs—is predicted by the International Chamber of Commerce (ICC) to exceed $US 1 trillion dollars. Due to increased globalization, manufacturing delocalization, sophisticated supply chains and complex distribution models, it has become more difficult for manufacturers to track products from the point of manufacture to end-user. As a result, there has been intense activity in the development of authentication methods to verify authenticity at different points in the product lifecycle, including at the consumer level.

There are many commercial methods that use lasers for tagging goods, including inkjet printing, and laser engraving and printing. These methods produce patterns of tens of micrometers in size that are easily imaged with a microscope and could easily be replicated.

SUMMARY OF THE INVENTION

Embodiments of the present invention overcome the disadvantages and limitations of the prior art by providing an apparatus and method including a nano-stamp, which upon interrogation using near infrared, visible or ultraviolet light generates a unique, far-field pattern that can be read, and allows one to verify the authenticity of a part bearing the nano-stamp without revealing the geometrical features of the nano-stamp.

Another object of embodiments of the present invention is to provide an apparatus and method including a nano-stamp, which cannot be viewed using an optical microscope, scanning electron microscope or atomic force microscope without significant difficulty, but which upon interrogation using near infrared, visible or ultraviolet light generates a unique, far-field pattern that can be read.

Additional objects, advantages and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the method for validating a security seal having a periodic nano-structured surface with a chosen period width, and a selected direction on the nano-structured surface, hereof includes: directing a laser beam having a selected wavelength longer than the chosen period width onto a region of the nano-structured surface at a chosen angle of incidence, and a chosen azimuthal angle relative to the selected direction on the nano-structured surface; and receiving far-field light from the nano-structured surface on a detector disposed a selected distance from the region of the nano-structured surface.

In another aspect of the present invention, and in accordance with its objects and purposes, the system for validating a security seal, hereof includes: a security seal having a periodic nano-structured surface with a chosen period width, and a selected direction on the nano-structured surface; a laser having a selected wavelength longer than the chosen period width for generating a beam of light directed onto a region of the nano-structured surface of the seal at a chosen angle of incidence relative to the normal of the nano-structured surface, and a chosen azimuthal angle relative to the selected direction on the nano-structured surface; and a detector for receiving far-field light from the nano-structured surface disposed at a selected distance from the region of the nano-structured surface.

Benefits and advantages of the present invention include, but are not limited to, an apparatus and method for reading a security seal having a virtually unlimited number of unique observable far-field patterns depending on the chosen parameters of the reader, wherein the seal is invisible to the eye and to an optical microscope, is difficult to replicate or alter, thereby permitting a high degree of security for the seal, and can be readily fabricated using compact, table-top extreme ultraviolet (EUV) lasers.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 2A is a schematic representation of a perspective view of an embodiment of the nano-structured surface, or nano-stamp, of the present invention, illustrating an array of periodic square pillars 200 nm wide and 120 nm high, and separated by 410 nm, formed from an HSQ resist on a substrate, while

DETAILED DESCRIPTION OF THE INVENTION

Figure 1:
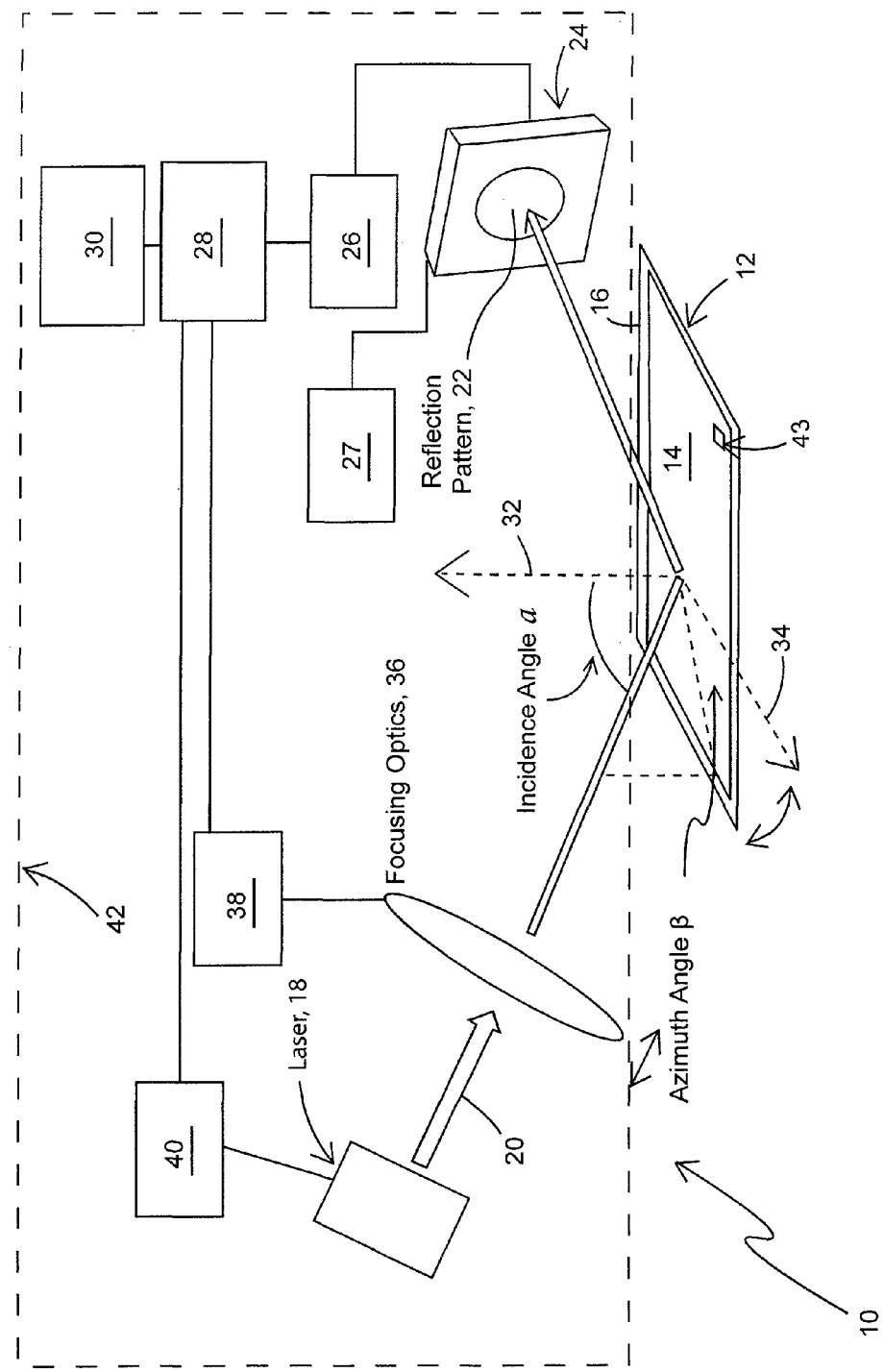
FIG. 1 is a schematic representation of an embodiment of the optical system for reading the nano-stamp and detecting authenticity thereof, illustrating a near infrared, visible or ultraviolet laser beam focused at the surface of the nano-stamp impinging at a chosen angle of incidence and azimuthal angle, thereby generating a unique pattern that is detected and imaged by a digital image detector.

The present invention includes a method for generating periodic pattern in a material containing features having dimensions of hundreds of nanometers, advantageously, sub-100 nm are arranged in a variety of motifs that is defect-free and that can readily be identified using a simple-to-use, practical, compact imaging system, that is difficult to replicate, and invisible to the eye or an optical microscope. In what follows, the terms "nano-structured surface," "nano-stamp," "invisible nano-stamp,"' and "security seal," will be used interchangeably. Such seals find significant value for combatting counterfeiting; for example, a nano-stamp could be directly patterned on the inside surface of the crystal or glass of an expensive watch, or onto the frames of luxury glasses and other costly products. The seal may be patterned in many materials, depending on the specific product use intended.

Sub-100 nm features of the seal match extreme ultraviolet (EUV) wavelengths and, therefore, EUV technology may be utilized to produce these seals using photons. Further, direct inspection of the seal is beyond the resolution capabilities of optical microscopes and the naked eye, so that simple copying is not possible. Visualization of the nano-stamp itself requires the utilization of an atomic force microscope or a scanning electron microscope, as examples, or similar sophisticated instrumentation. However, the seal can be buried under a layer of material that is transparent to the laser light, for example, a layer of silicon dioxide deposited by a low-temperature process, to render the seal undetectable by a scanning electron microscope, an atomic force microscope, or other surface analysis methods, unless the layer is removed without damaging the underlying nano-structured seal. Although it may be possible to read the seal with considerable effort, a high level of expertise and expensive instrumentation, replication thereof would also be challenging as it cannot be achieved using conventional methods. Fabricating defect-free nano-patterns would require the use of an electron beam writer (or an e-beam lithography system), or EUV lithography, as examples, which are costly and sophisticated processes.

Diffraction occurs when an optical beam impinges on a periodic pattern, typically micron-size groves fabricated in metallic or dielectric materials. In the far field the diffraction pattern from such gratings consists of rays that project at predicted directions with respect to the grating's normal. The angle, θ, of the diffracted rays for a grating illuminated at normal incidence is calculated from the expression: $2d \sin \theta = n\lambda$, where d is the period of the grating, λ is the wavelength of the illumination and n is an integer. The grating period d can be inferred from the measured diffraction pattern, if the wavelength and angle of the illumination are known, when $d > \lambda$. If the features of the grating are smaller than $\lambda/2$, the diffraction pattern vanishes, and the grating equation does not have a physical solution. In accordance with embodiments of the present invention, a periodic nano-structured surface is read using near-infrared, visible and ultraviolet radiation having wavelengths longer than the periodic distances of the pattern. As will be described hereinbelow, far-field patterns are generated by modification of the wavefront of the incoming laser beam upon reflection from the security seal, and detected.

Nano-stamps having sub-100 nm features arranged in chosen or arbitrary periodic motifs have been found to produce distinct, far-field patterns when illuminated by near infrared, visible or ultraviolet light that is unique to the feature size and periodicity of the nano-pattern. Such patterns may be phase or absorption features transferred onto a substrate and observed in the far-field. For example, a substrate bearing the seal may be affixed to the surface of an object, or the seal applied directly to the surface thereof. If the object is a transparent material, for example the screen of a smart telephone, the seal might be placed onto the screen, or more advantageously on the inner surface of the screen. For a chosen sub-wavelength feature size, periodicity and motif of a periodic nano-stamp pattern, distinct, far-field intensity distributions or patterns are observed for selected illumination wavelengths, angle of incidence and wavefront curvature. Since the far-field intensity distributions depend on illumination parameters, the security stamp can be uniquely identified using a reader which includes an optical (e.g. near infrared, visible or ultraviolet) laser having a chosen wavelength directed at a selected angle of incidence and azimuthal angle, and focused onto the nano-structured surface of the security stamp, and a two-dimensional image detector, such as a charge-coupled detector, a chosen distance from the region of impingement by the laser beam. A computer algorithm installed on a microprocessor in the reader compares the acquired image with image of a valid seal stored in the reader for these illumination parameters to validate the stamp authenticity.

As stated hereinabove, for a given seal the reflection or transmission signature will change with the angle of incidence, α, the azimuthal angle, β, the wavelength, the focusing of the impinging reading radiation, and the distance from the interrogated region to the detector. Thus, with a single master design (a Talbot mask, as an example), it is straightforward to change the encoding parameters of the reader unit, which may be termed a "hardware" key for reading the seal, while the encoded image encrypted in the RAM of the reader may be considered a "software" key. Both security keys contribute to the robustness of the present method by making it very difficult to determine the geometry of the seal from the far-field pattern of a laser beam that is directed onto the surface of the seal.

The combination of table-top EUV lasers with Talbot lithography (See, e.g., "Defect-Free Periodic Structures Using Extreme Ultraviolet Talbot Lithography In A Table-Top System," by Wei Li et al., J. Vac. Sci. Techno. B 31(6), November/December 2013, pp. 1-7; "Defect Tolerant Extreme Ultraviolet Lithography Technique," by Lukasz Urbanski et al., J. Vac. Sci. Technol. B 30(6), November/December 2012 pp. 1-5; "Talbot Lithography: Self-Imaging Of Complex Structures," by A. Isoyan et al., J. Vac. Sci. Technol. B 27(6), November/December 2009, pp. 2931-2937; and "Defect-Tolerant Extreme Ultraviolet Nanoscale Printing," by L. Urbanski et al., Optics Letts. 37(17), pp. 3633-3635, September 2012.) may be used to fabricate a master for the nano-stamps as well as for replicating the seals, which can be printed in few seconds. This fabrication method is non-contact, and does not employ optics; consequently, the master (or Talbot mask) is not subject to wear. Additionally, Talbot imaging will produce seals without errors, even if the master is damaged or contaminated.

Error-free replication of nano-seals is an important feature of embodiments of the present invention, because exactly the same seal must be generated for all seals, since if there are errors in a pattern, the reader will not validate the seal.

Reference will now be made in detail to the present embodiments of the invention, examples of which are illustrated in the accompanying drawings. In the FIGURES, similar structure will be identified using identical reference characters. It will be understood that the FIGURES are for the purpose of describing particular embodiments of the invention and are not intended to limit the invention thereto. Turning now to FIG. 1, an embodiment of apparatus, 10, for reading and validating security stamp, 12, is shown. As will be described in more detail in FIGS. 2A and 2B, hereof, security stamp 12 includes a chosen periodic array of features having arbitrary shape, 14, having dimensions of hundreds of nanometers or less, formed on the surface, 16, thereof. Laser, 18, having output, 20, with wavelengths greater than the spacing of the features in pattern 14, typically, in the near infrared, visible or ultraviolet regions of the electromagnetic spectrum, illuminates surface 16 of the nano-stamp 12. The features in pattern 14, generate a unique far-field pattern or image, 22, which may be recorded on two-dimensional (2D) detector array, 24. Detector array 24 may comprise a CMOS array or a charge-coupled detector (CCD), as examples, the output of which is directed into signal processor, 26, for processing. The reflected signal may be optimized on detector array 24 by moving the array using positioner, 27.

Microprocessor, 28, receives the output from signal processor 26 for analysis and display or validation device, 30, if desired. The laser wavelength, $\lambda$, the angle of incidence, $\alpha$, relative to normal, 32, to surface 16, and azimuth, $\beta$ of the illumination, relative to a chosen direction, 34, on surface 16, the curvature of the wavefront resulting from the location of focusing optics, 36, along laser output 20, and the design of periodic pattern 14 in nano-stamp 12 can independently change far field pattern 22, which may then be utilized as the signature of the stamp. In situations where the laser beam has little divergence, the focusing optics may be eliminated unless an additional parameter is desired. Microprocessor 28, controls translating device, 38, and positioning device, 40, for moving focusing optics 36 along laser beam 20 relative to pattern 14, and pivoting laser beam 20 around chosen direction 34 on seal 12 and changing the angle of incidence, respectively, to define these parameters for recording by computer 28. Computer 28 may also control positioner 27 for optimizing the reflected signal from seal 12. Elements 24, 26, 27, 28, 30, 36, 38, and 40, collectively, form reader, 42. Clearly, other apparatus may be envisioned for interpreting and validating pattern 22. For example, for a single set of parameters, it may be possible to eliminate the control positioners, and use the elements in a cell phone or tablet with a custom software application as the reader.

In use, apparatus 10 generates reflection pattern 22 from seal 12 using reader 42. Seal 12 may have a readable identification tag, 43, shown on surface 16 thereof, whereby parameters recorded in microprocessor 28 for the angle of incidence, the azimuthal angle, the laser wavelength, the position of the focusing optics, the location of reader 24 if needed, for the collection of seals (copies) identified by tag 43, would be set in reader 42, making it a dedicated reader for this collection of seals, and reflection patterns 22 for a particular seal 12 in the collection of seal would be recorded. The recorded signals would be validated against those for at least one seal known to be authentic having these recorded parameters. Identity tag 43 would not be required in the situation where only certain types of goods or other objects are marked with seals in accordance with embodiments of the present invention; that is, where a person tasked with the validation knows the set of parameters.

The collected and stored information may be encrypted, and known image comparison algorithms may be used to validate a particular stamp for anti-counterfeiting applications, since pattern 22 is unique for the particular recorded parameters. A dedicated or matched reader 42 would have all of these parameters pre-programmed, whereby a seal to be validated would simply be interrogated by the reader, and compared with a known, valid seal. One might "relax" the need for using all of the identified parameters by lessening the matching criteria for validation. That is, validation of a seal for a $3,000 luxury item might be more forgiving than one for a $100,000 aircraft part.

Having generally described the invention, the following EXAMPLE provides greater detail.

EXAMPLE

Figure 2A:
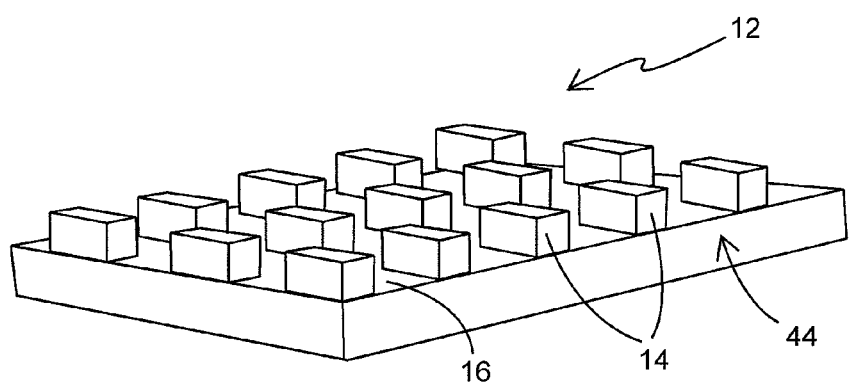
Figure 2B:
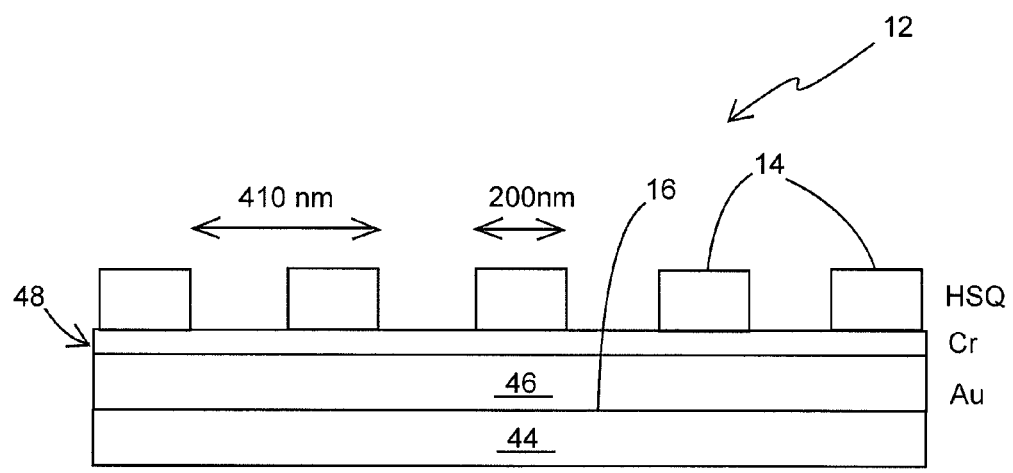
FIG. 2B is a schematic representation of a side view thereof.

Observation of a Unique Far-Field Reflection Pattern from a Nano-Stamp:

Turning now to FIGS. 2A and 2B, shown is nano-stamp 12 fabricated on a Si substrate, 44, covered by 160 nm of Au, 46, 10 nm of Cr, 48, on surface 16, followed by a patterned layer of hydrogen silsesquioxane (HSQ) cured photoresist. The HSQ has similar optical characteristics to $SiO_2$. Nano-stamp 12 was patterned 14 by Talbot imaging of a mask using an extreme ultraviolet (EUV) light (46.9 nm) capillary discharge laser, whereby a pattern virtually free of defects was generated within its entire area. The mask was a 100 nm thick Si membrane covered with 80 nm of HSQ, and squares were generated thereon using e-beam lithography. Substrate 44 for nano-stamp 12 was located in the first Talbot plane of the mask. Talbot lithography produces one to one replicas of the mask.

Pattern 14 in nano-stamp 12 included 200 nm×200 nm rectangular HSQ pillars having a height of 120 nm and a periodicity of 410 nm, as an example of such an array. Clearly, periods may be greater than zero and less than 100 nm. The features comprising the nano-stamp may have any arbitrary shape. The transparent pillars on top of the Au surface introduce a phase across the illumination beam that generates the unique pattern in the diffracted beam. FIG. 2A is a schematic representation of a perspective view the periodic square pillars, which are transparent at the illumination wavelength, while FIG. 2B is a schematic representation of a side view thereof.

Figure 3A:
FIG. 3A is a far-field image pattern recorded on a CCD camera produced from a focused Helium Neon laser beam impinging on the nano-stamp illustrated in FIG. 2 hereof at a first chosen focal position, which defines a particular curvature of the wavefront of the illuminating beam.
Figure 3B:
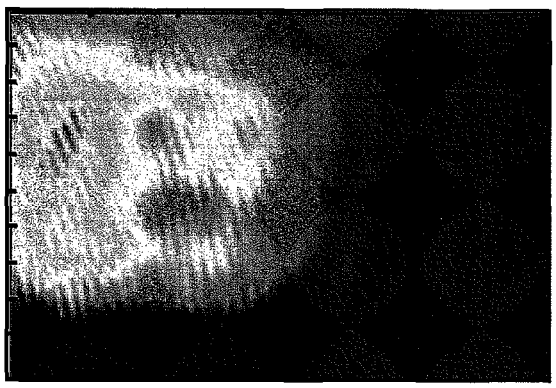
FIG. 3B is a far-field image pattern generated in a similar manner to that of FIG. 3A, except that the focusing lens employed is moved about 3 mm closer to the nano-stamp.
Figure 3C:
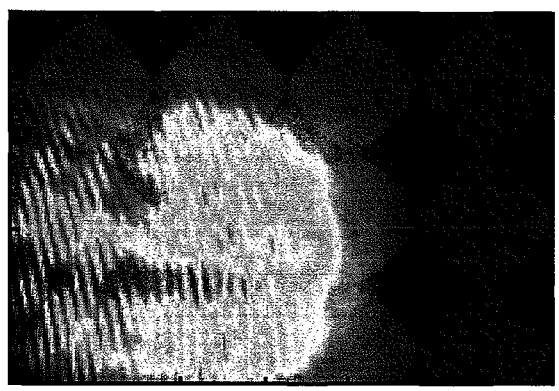
FIG. 3C is a far-field image pattern generated in a similar manner to that of FIG. 3A, except that the focusing lens employed is moved about 3 mm closer to the nano-stamp than the focusing lens employed in FIG. 3B.

Nano-stamp 12 was illuminated by a focused HeNe beam 20 as shown in FIG. 1. The far-field diffraction pattern was recorded with a 2D CCD detector. The angle of incidence angle was approximately 20° and the focal length of lens 36 was selected to be 10 cm. FIGS. 3A-3C show distinct patterns associated with the geometry of the nano-scale pattern of nano-stamp 12. Changing the focusing of laser beam 20, which changes the curvature of the wavefront, by moving lens 36 in approximately 3 mm increments along beam 20 clearly modifies the diffraction patterns. Thus, focusing is seen to be a useful authentication parameter.

Figure 4A:
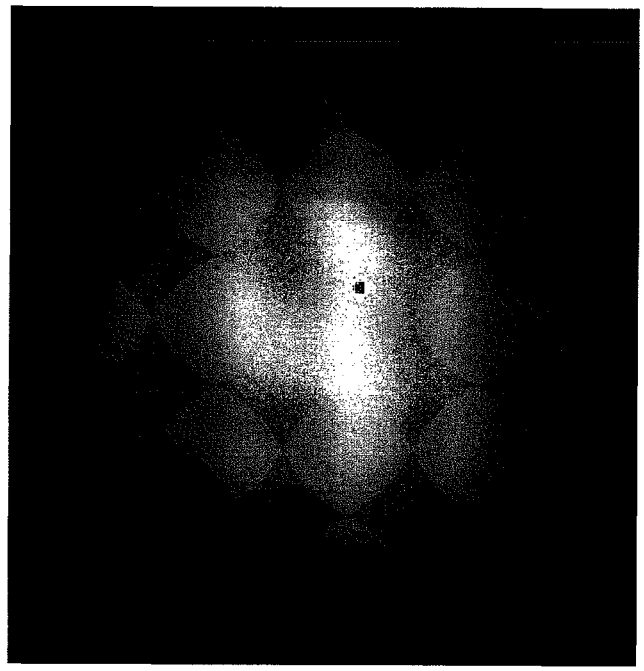
FIG. 4A is a far-field pattern generated in a manner similar to those of FIG. 3 hereof, with a 0° azimuthal angle, β, while FIG. 4B accentuates what appears to be an "S" in the pattern drawn to guide the eye of the reader.
Figure 4B:
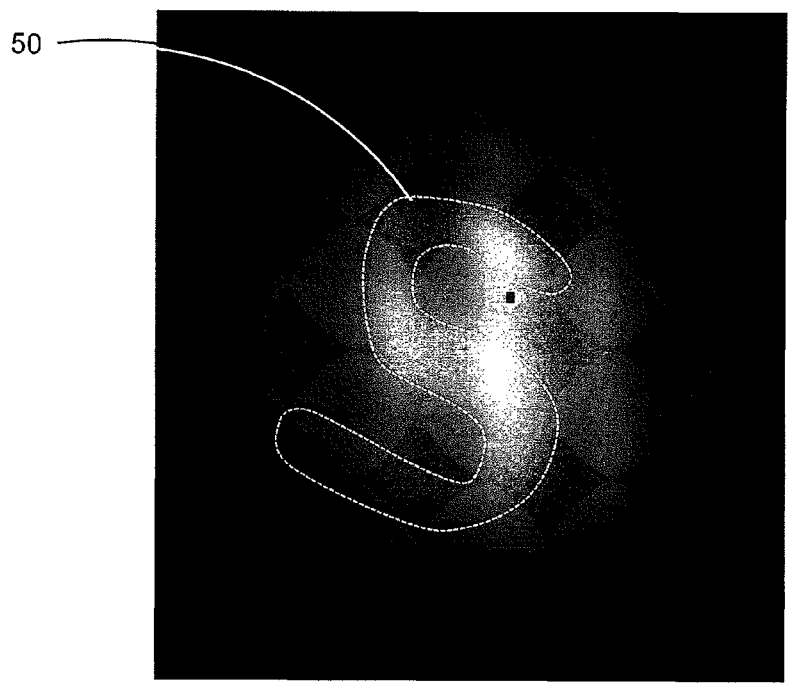
Figure 5A:
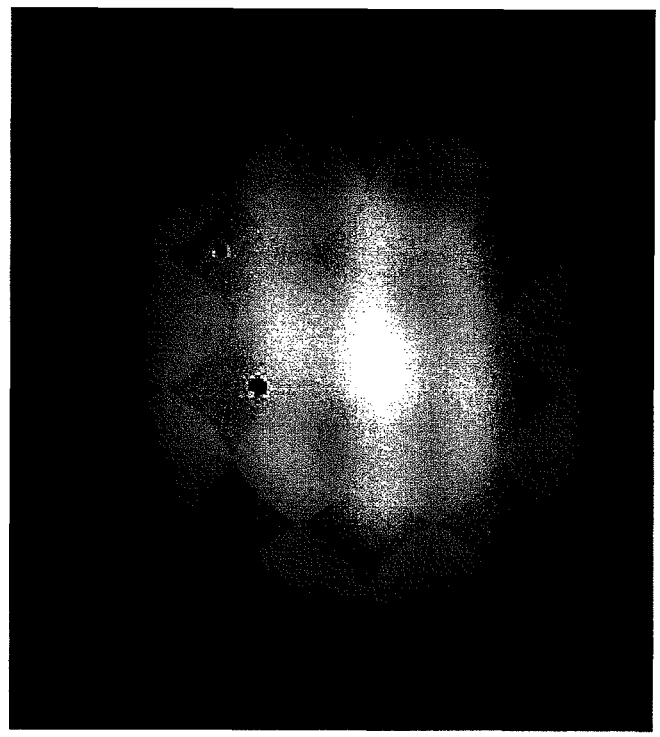
FIG. 5A is a far-field pattern generated in a manner similar to those of FIG. 3 hereof, with a 10° azimuthal angle, β, while FIG. 5B accentuates what appears to be an "S" in the pattern rotated from that of FIG. 4B.
Figure 5B:
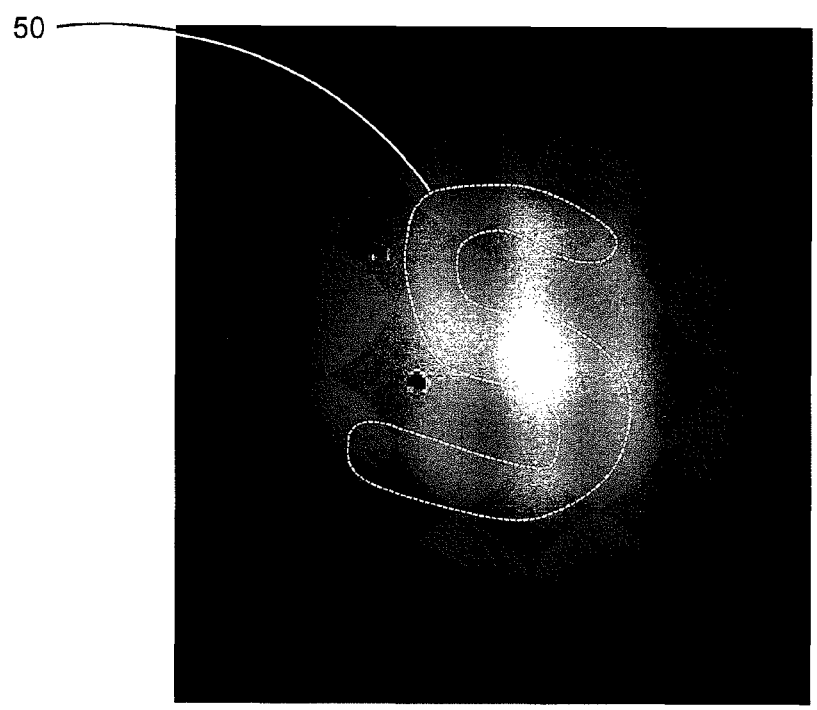
Figure 6A:
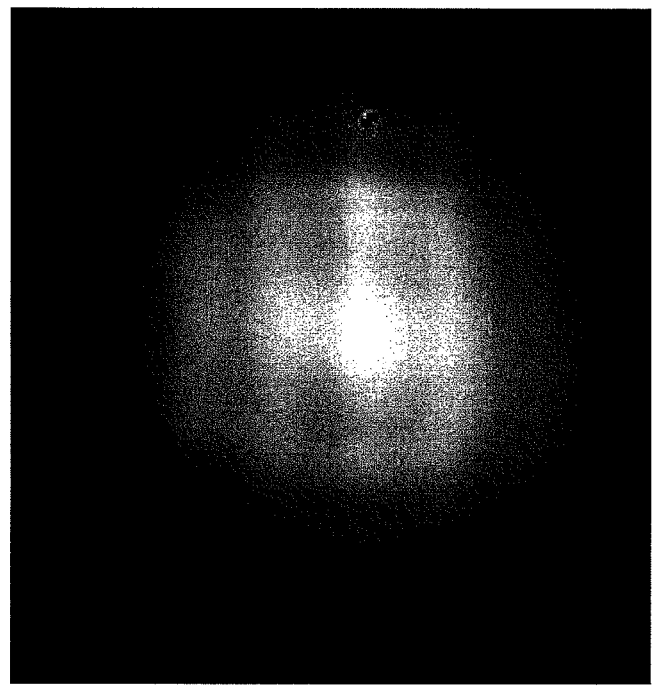
FIG. 6A is a far-field pattern generated in a manner similar to those of FIG. 3 hereof, with a 20° azimuthal angle, β, while FIG. 6B accentuates what appears to be an "S" in the pattern rotated from that of FIGS. 4B and 5B.
Figure 6B:
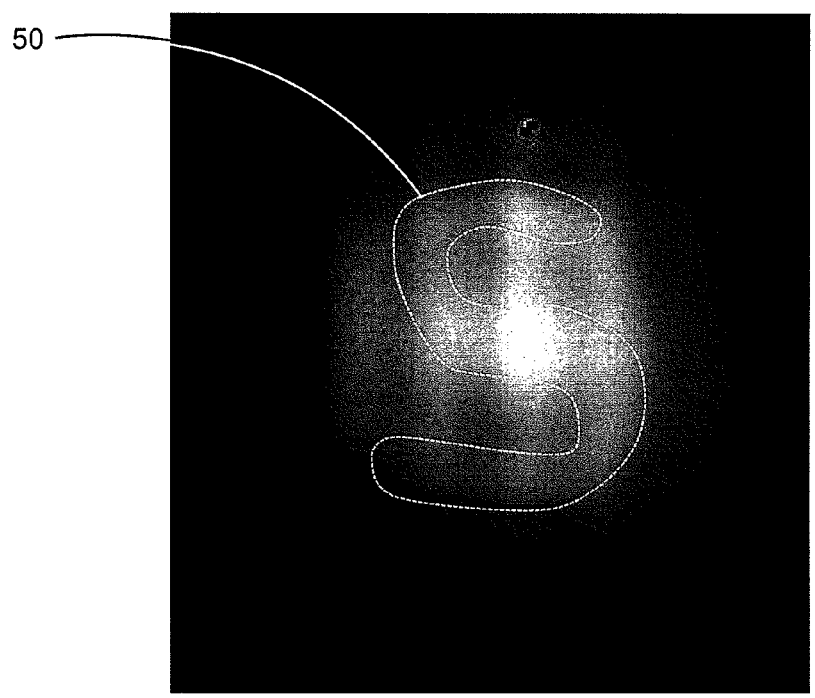

As may be observed from FIGS. 4A,B, 5A,B, and 6A,B, the far-field pattern also changed when azimuthal angle β was changed by 10°. For these FIGURES, the azimuthal angle was changed by rotating nano-stamp 12 relative to reader 42. What appears to be an "S" in each FIGURE is accentuated by dashes, 50, drawn to guide the eye of the reader, and shows the rotation of the far-field pattern as the azimuthal angle is changed.

As stated hereinabove, changing the motif of nano-pattern 14 in seal 12, the angle of incidence α, the azimuth angle β, the wavelength λ of the illumination, the focusing, and the distance between the illuminated region on the seal and the detector, will also produce changes in the far-field pattern, thereby confirming that a periodic nano-stamp in combination with a dedicated reader that does not give direct information on the geometrical pattern of the seal, provides a robust brand protection that will be difficult and very expensive to replicate or alter.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for validating a security seal having sub-100 nm features on the surface thereof with a chosen period, and a selected direction on the surface, comprising:
   directing a laser beam having a single selected wavelength longer than the chosen period onto a region of the surface at a chosen angle of incidence, and a chosen azimuthal angle relative to the selected direction on the surface;
   receiving far-field light produced by the sub-100 nm features of the surface on a detector disposed at a selected distance from the region of the surface; and
   validating the security seal.

2. The method of claim 1, further comprising the step of focusing the laser beam onto the region of the surface using focusing optics disposed at a chosen location along the laser beam.

3. The method of claim 1, further comprising the step of comparing the received light with a reference light pattern acquired by illuminating a region of a valid security seal having a known periodic surface, using laser beam light having the single selected-wavelength, the chosen angle of incidence to the known surface, the chosen azimuthal angle relative to the selected direction on the known surface, and received on the detector disposed at the selected distance from the region of the known surface.

4. The method of claim 3, further comprising the step of generating an alarm when the received light from the security seal and the received light from the known valid security seal differ by selected criteria.

5. The method of claim 1, wherein the surface is buried under a layer of material transparent to the laser light.

6. The method of claim 1, wherein the chosen period is greater than 0 nm and less than 200 nm.

7. The method of claim 1, wherein the single laser wavelength is chosen from the near infrared, visible and ultraviolet region of the electromagnetic spectrum.

8. The method of claim 1, wherein the periodic sub-100 nm features further comprise an identity tag.

9. The method of claim 1, wherein the sub-100 nm features are generated using extreme ultraviolet light or vacuum ultraviolet light.

10. The method of claim 9, wherein the extreme ultraviolet light is produced using a capillary discharge extreme ultraviolet laser.

11. The method of claim 9, wherein the sub-100 nm features are generated using Talbot mask imaging.

12. The method of claim 1, wherein the sub-100 nm features comprise an absorption pattern or a phase pattern, or a combination of an absorption pattern and a phase pattern.

13. A method for validating a security seal having sub-100 nm features on the surface thereof with a chosen period, and a selected direction on the surface, comprising:
    directing a laser beam having a single selected wavelength longer than the chosen period onto a region of the surface at a chosen angle of incidence, and a chosen azimuthal angle relative to the selected direction on the surface;
    focusing the laser beam onto the region of the surface using focusing optics disposed at a chosen location along the laser beam;
    receiving far-field light produced by the sub-100 nm features on the surface on a detector disposed a selected distance from the region of the surface; and
    validating the security seal.

14. A system for validating a security seal, comprising:
    a security seal having sub-100 nm features on the surface thereof with a chosen period, and a selected direction on the surface;
    a laser configured to generate a single selected wavelength longer than the chosen period for generating a beam of light directed onto a region of the surface of said seal at a chosen angle of incidence relative to the normal of the surface, and a chosen azimuthal angle relative to the selected direction on the surface; and
    a detector configured to receive far-field light produced by the sub-100 nm features of the surface disposed at a selected distance from the region of the surface and validate the security seal.

15. The apparatus of claim 14, further comprising focusing optics disposed at a chosen location along the laser beam for focusing the laser beam onto the region of the first surface.

16. The apparatus of claim 14, further comprising a valid security seal having a known periodic sub-100 nm features on the surface thereof, for comparing the light received on said detector with a reference light pattern acquired by illuminating a region of using a beam of laser light having the single elected wavelength, the chosen angle of incidence on the known surface, the chosen azimuthal angle relative to the selected direction on the known surface, and received on said detector disposed at the selected distance from the region of the known surface.

17. The apparatus of claim 14, wherein the surface of said security seal is buried under a layer of material transparent to the laser light.

18. The apparatus of claim 14, wherein the chosen period is greater than 0 nm and less than 200 nm.

19. The apparatus of claim 14, wherein the laser wavelength is chosen from the near infrared, visible and ultraviolet region of the electromagnetic spectrum.

20. The apparatus of claim 14, wherein the sub-100 nm features further comprise an identity tag.

21. The apparatus of claim 14, wherein the sub-100 nm features are generated using extreme ultraviolet light or vacuum ultraviolet light.

22. The apparatus of claim 21, wherein the extreme ultraviolet light is produced using a capillary discharge extreme ultraviolet laser.

23. The apparatus of claim 21, wherein the sub-100 nm features are generated using Talbot mask imaging.

24. The apparatus of claim 14, wherein the sub-100 nm features comprise an absorption pattern or a phase pattern, or a combination of an absorption pattern and a phase pattern.

* * * * *